United States Patent
Shiba et al.

(10) Patent No.: US 7,964,673 B2
(45) Date of Patent: Jun. 21, 2011

(54) PROTON-CONDUCTING POLYMER

(75) Inventors: Tadahiro Shiba, Shiki (JP); Hitoshi Iwadate, Iruma-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 707 days.

(21) Appl. No.: 12/009,951

(22) Filed: Jan. 22, 2008

(65) Prior Publication Data
US 2008/0200629 A1    Aug. 21, 2008

(30) Foreign Application Priority Data
Jan. 22, 2007 (JP) .................. 2007-011351

(51) Int. Cl.
*C08F 8/18* (2006.01)

(52) U.S. Cl. .............. 525/328.8; 525/359.3; 525/384; 525/419; 525/420

(58) Field of Classification Search .............. 525/328.8, 525/359.3, 384, 419, 420
See application file for complete search history.

(56) References Cited

U.S. PATENT DOCUMENTS

| | | | |
|---|---|---|---|
| 3,759,738 A * | 9/1973 | Misumi et al. ............... | 427/552 |
| 4,720,345 A * | 1/1988 | Linder et al. ............... | 210/650 |
| 6,214,891 B1 * | 4/2001 | Schneller et al. ............. | 521/27 |
| 6,759,441 B1 * | 7/2004 | Kerres et al. .................. | 521/27 |
| 6,977,122 B2 * | 12/2005 | Colombo et al. ............. | 429/494 |
| 7,378,471 B2 * | 5/2008 | Kim et al. .................... | 525/328.8 |
| 7,455,934 B1 * | 11/2008 | Araki et al. ................... | 429/309 |
| 2003/0035991 A1 * | 2/2003 | Colombo et al. .............. | 429/33 |
| 2005/0112440 A1 * | 5/2005 | Kim et al. ..................... | 429/33 |
| 2006/0269815 A1 * | 11/2006 | Goldbach et al. .............. | 429/33 |

FOREIGN PATENT DOCUMENTS

| | | | |
|---|---|---|---|
| JP | 2002-280029 | | 9/2002 |
| JP | 2006-260962 | | 9/2006 |
| JP | 2008-202025 | * | 9/2006 |
| JP | 2008-270177 | * | 11/2006 |

OTHER PUBLICATIONS

U.S. Appl. No. 12/053,196, filed Mar. 21, 2008.

* cited by examiner

*Primary Examiner* — Peter D. Mulcahy
*Assistant Examiner* — Henry Hu
(74) *Attorney, Agent, or Firm* — Nelson Mullins Riley & Scarborough LLP; Anthony A. Laurentano, Esq.; John S. Curran, Esq.

(57) ABSTRACT

A proton-conducting polymer comprises a main chain and a plurality of branched side chains extending radially therefrom. The branched side chains are each bonded to a proton-conducting salt at the end. In the proton-conducting polymer, the salts can be circumscribed by a virtual circle having a center on the cross-sectional center of the main chain such that a radial direction of the virtual circle is perpendicular to a longitudinal direction of the main chain. Thus, the proton-conducting polymer has a substantially cylindrical structure, and the salts are located on the peripheral wall of the substantially cylindrical structure. Protons are transferred between the adjacent salts, so that a conduction channel is formed on the peripheral wall of the cylindrical structure.

10 Claims, 3 Drawing Sheets

FIG. 3

| | GENERATION NUMBER | CONDUCTIVITY [S/cm] |
|---|---|---|
| EXAMPLE 1 | G1 | $2.3 \times 10^{-4}$ |
| EXAMPLE 2 | G2 | $5.5 \times 10^{-4}$ |
| EXAMPLE 3 | G3 | $5.6 \times 10^{-4}$ |
| EXAMPLE 4 | G6 | $1.3 \times 10^{-3}$ |
| EXAMPLE 5 | G1 | $1.7 \times 10^{-5}$ |
| EXAMPLE 6 | G2 | $1.3 \times 10^{-4}$ |
| EXAMPLE 7 | G3 | $1.4 \times 10^{-4}$ |
| EXAMPLE 8 | G1 | $2.3 \times 10^{-5}$ |
| EXAMPLE 9 | G2 | $8.9 \times 10^{-5}$ |
| EXAMPLE 10 | G3 | $1.1 \times 10^{-4}$ |
| EXAMPLE 11 | G3 | $9.3 \times 10^{-4}$ |
| EXAMPLE 12 | G3 | $1.1 \times 10^{-3}$ |
| EXAMPLE 13 | G3 | $5.4 \times 10^{-4}$ |
| COMPARATIVE EXAMPLE | - | $3.7 \times 10^{-6}$ | ern suitably usable as an electrolyte for hydrogen fuel cells,
PROTON-CONDUCTING POLYMER

BACKGROUND OF THE INVENTION

1. Field of the Invention

The present invention relates to a proton-conducting polymer suitably usable as an electrolyte for hydrogen fuel cells, direct methanol fuel cells, and the like.

2. Description of the Related Art

A fuel cell is produced by the steps of interposing an electrolyte between an anode and a cathode, sandwiching thus obtained electrolyte-electrode joined assembly between a pair of separators to form a unit cell, and stacking a predetermined number of such unit cells. The electrolyte may be a proton-conducting polymer, which functions to transfer protons generated on the anode to the cathode.

A perfluoropolymer and an organic substance prepared by adding sulfonic acid to an aromatic hydrocarbon are known as the proton-conducting polymer. The sulfonic acid-added organic substance cannot show a sufficient proton conductivity singly, and thereby is used under wet condition to achieve a practically preferred conductivity. Therefore, in the case of using the proton-conducting polymer of the sulfonic acid-added organic substance as the electrolyte in the fuel cell, a humidifier is used for humidifying both reaction gases (a fuel gas for the anode and an oxidant gas for the cathode) to maintain the electrolyte under the wet condition.

When moisture is excessively supplied to the reaction gases, reaction gas passages are disadvantageously obstructed by the moisture, whereby the supply rates of the gases are lowered to cause deterioration in the electricity generation of the fuel cell. A method for appropriately controlling such a moisture supply amount is proposed in Japanese Laid-Open Patent Publication No. 2002-280029.

When the fuel cell is used at an environmental temperature below the freezing point, the moisture supplied to the reaction gases is frozen. In this case, to prevent the freeze, the fuel cell is generally heated by a large external heater and then driven (see Japanese Laid-Open Patent Publication No. 2006-260962).

As described above, when the fuel cell containing the electrolyte of the sulfonic acid-added organic substance is driven, it is necessary to strictly control the reaction gas humidity and the driving temperature. Further, since the external humidifier and heater are needed, the fuel cell system is disadvantageously large, resulting in increased equipment investment.

SUMMARY OF THE INVENTION

A general object of the present invention is to provide a proton-conducting polymer usable in fuel cells without controlling reaction gas humidity.

A principal object of the present invention is to provide a proton-conducting polymer suitably usable for simple fuel cell systems.

Another object of the present invention is to provide a proton-conducting polymer capable of lowering equipment investment of fuel cell systems.

According to an aspect of the present invention, there is provided a proton-conducting polymer comprising a linear main chain and a plurality of branched side chains. Each of the branched side chains is bonded to the main chain at one end and bonded to a proton-conducting salt at the other end. The branched side chains extend radially from the main chain, and the salts of the different branched side chains are circumscribed by a virtual circle having a center on the cross-sectional center of the main chain such that a radial direction of the virtual circle is perpendicular to a longitudinal direction of the main chain.

The virtual circle extends along the longitudinal direction of the main chain, and thus the proton-conducting polymer has a substantially cylindrical structure. The salts are located on the peripheral wall of the substantially cylindrical structure, and protons are transferred between the salts to achieve the proton conductivity.

In the present invention, moisture is not needed to achieve the proton transfer. In other words, the proton-conducting polymer can show an excellent proton conductivity even under dry condition.

Thus, in the case of using the proton-conducting polymer as an electrolyte in a fuel cell, reaction gases do not have to be humidified. Consequently, the problem of obstruction in reaction gas passages can be solved in this case. It is not necessary to strictly control the reaction gas humidity. Further, because it is not necessary to supply the moisture to the reaction gases, there is no need to worry about the problem of the freeze. Therefore, even when the fuel cell is used at an environmental temperature below the freezing point, the fuel cell can be driven without heating.

For the above reasons, the fuel cell can be used without humidifiers and heaters. Thus, the fuel cell can be used in a simple system with low equipment investment.

It is preferred that each of the branched side chains is bonded to at least one acid or base for forming the salt. In this case, the salt is strongly bonded to the branched side chain, so that the polymer shows a stable proton conductivity. Further, a plurality of the salts are densely arranged, thereby increasing the proton conductivity.

A dendrimer prepared by repeatedly bonding a repeating unit can be preferably used as the branched side chain. In this case, the proton-conducting polymer can be easily produced. Further, a distance between adjacent salts is shortened in the polymer by repeatedly bonding a repeating unit, so that the proton transfer between the salts is accelerated, to further improve the proton conductivity.

It is preferred that the salt is derived from sulfonic acid and a primary or secondary amine. In this case, the resultant proton-conducting polymer is excellent in the proton conductivity and heat resistance.

The acids and bases bonded to the branched side chains do not always have to be in the salt state, and part thereof may be in the acid or base state. However, when a corresponding base or acid for forming the salt with the acid or base is excessively present in the free state, the vapor pressure is increased, so that the fuel cell containing the proton-conducting polymer as an electrolyte is often poor in operational stability at high temperature. It is preferred in view of this problem that the amount of the corresponding base or acid is 1 equivalent or less, per 1 equivalent of the acid or base bonded to the end of each branched side chain.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table showing the proton conductivities of samples according to Examples 1 to 13 and Comparative Example.

DESCRIPTION OF THE PREFERRED EMBODIMENTS

A preferred embodiment of the proton-conducting polymer of the present invention will be described in detail below with reference to the drawings.

Figure 1:
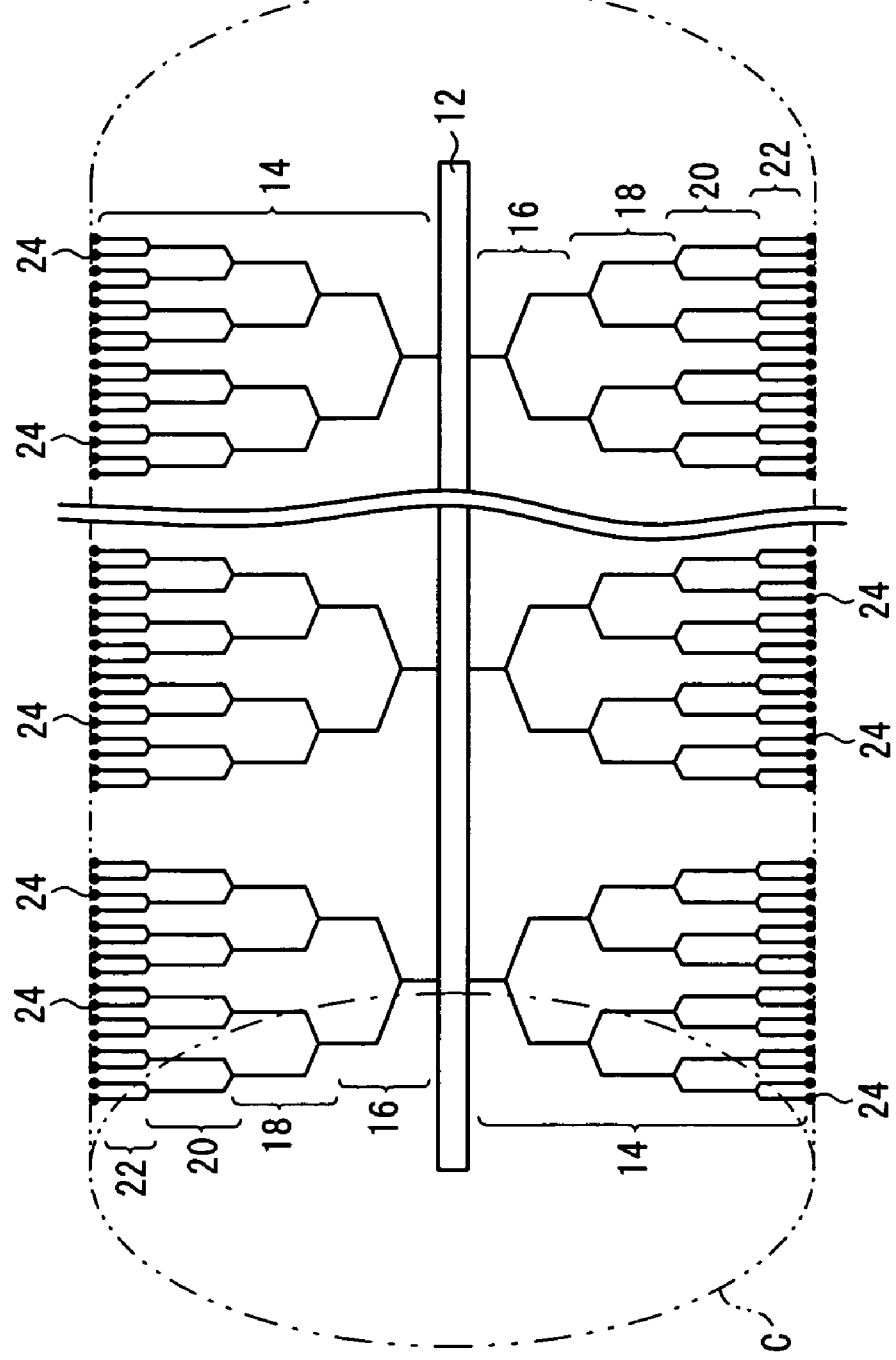
FIG. 1 is an explanatory, structural view showing a proton-conducting polymer according to an embodiment of the present invention along the longitudinal direction.
Figure 2:
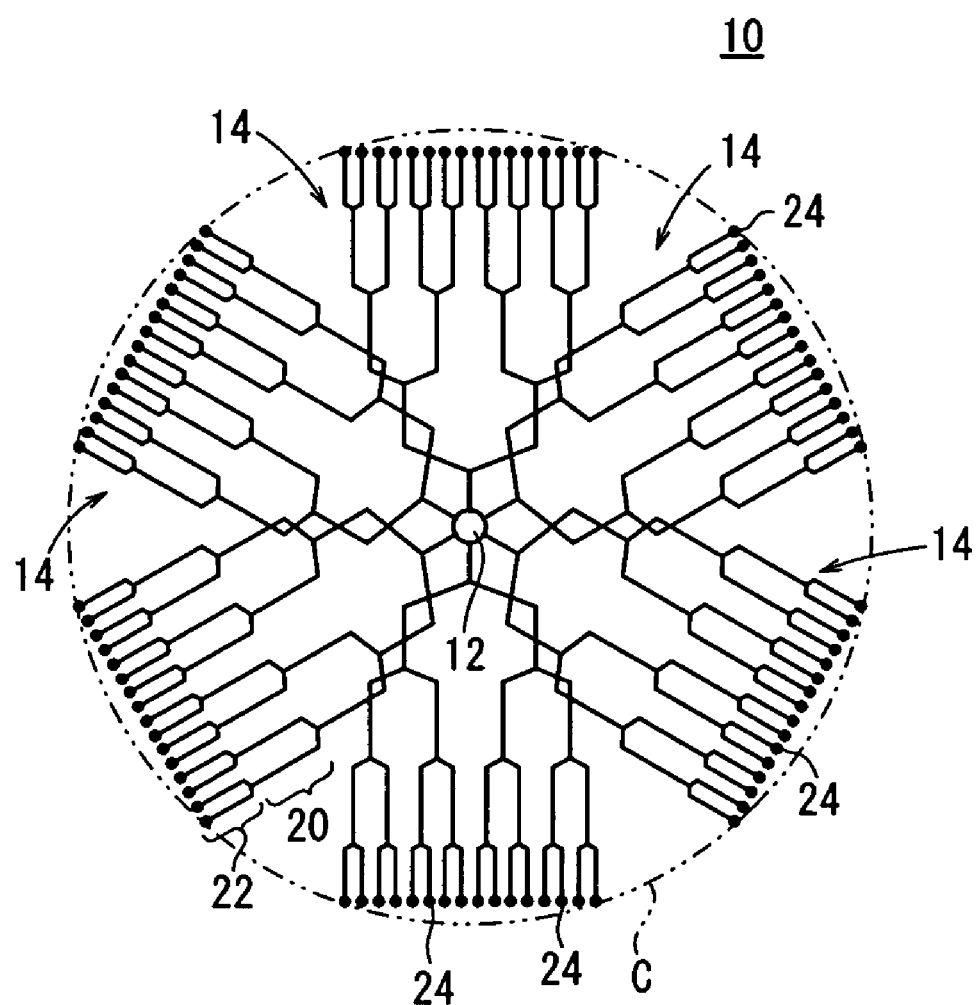
FIG. 2 is a front view showing the proton-conducting polymer of FIG. 1.

FIG. 1 is an explanatory, schematic structural view showing a proton-conducting polymer 10 according to this embodiment along the longitudinal direction, and FIG. 2 is a front view of the proton-conducting polymer 10. The proton-conducting polymer 10 has a main chain 12 and a plurality of branched side chains 14 bonded thereto.

The main chain 12 is not particularly limited as long as it can linearly extend and can be bonded to the branched side chains 14. The main chain 12 preferably comprises a hydrocarbon polymer, and specific examples thereof include aliphatic hydrocarbon polymers prepared by polymerizing a monomer having a double bond, such as polystyrene resins, polyethylene resins, polyacrylic resins, polymethacrylic resins, polyvinyl resins, and polyallyl resins.

The main chain 12 may comprise a resin having a main-chain heteroatom, such as a polyester, polyamide, or polyether resin, and may comprise a fluororesin such as a polytetrafluoroethylene or polyfluorovinylidene resin. Further, the main chain 12 may comprise an aromatic polymer such as a polyphenylene, polyphenylene ether, polyphenylene ether sulfone, polyphenylene ether ketone, polyphenylene amide, or polyphenylene ester resin, and may comprise a heterocyclic polymer such as a polybenzimidazole, polybenzoxazole, or polybenzothiazole resin.

In this embodiment, each of the branched side chains 14 has a structure divided into a first-generation branch 16 bonded directly to the main chain 12, second-generation branches 18 bonded to and branched from the first-generation branch 16, third-generation branches 20 bonded to and branched from the second-generation branches 18, and fourth-generation branches 22 bonded to and branched from the third-generation branches 20. The first-generation branches 16, the second-generation branches 18, the third-generation branches 20, and the fourth-generation branches 22 preferably have the same structures, though one or more branches thereof may be different. Thus, each of the branched side chains 14 comprises a dendrimer provided by repeatedly bonding a repeating unit in this embodiment.

Preferred examples of the branches 16, 18, 20, 22 include aliphatic esters, aromatic esters, aliphatic amines, aliphatic ethers, aromatic ethers, aliphatic amides, aromatic amides, saturated hydrocarbons, and fluorocarbons. The branches of different generations may be connected by a multivalent atom such as a carbon, nitrogen, silicon, or phosphorus atom, an aromatic ring such as a benzene ring, a heterocycle such as an imidazole ring, or an aliphatic ring such as a cyclohexane ring.

A proton-conducting salt 24 is bonded to the end of each fourth-generation branches 22 in the branched side chains 14. Thus, each branched side chain 14 is bonded to the main chain 12 at the end of the first-generation branch 16, and has the proton-conducting salt 24 at the end of each fourth-generation branch 22.

The salt 24 is preferably derived from a Brønsted acid and an amine. Examples of the Brønsted acids include sulfonic acid, phosphoric acid, and phosphonic acid, and examples of the amine include ammonia, aliphatic amines, alicyclic amines, and nitrogen-containing heterocyclic compounds such as imidazole, triazole, and pyridine. It is preferred that the salt 24 is derived from sulfonic acid and a primary or secondary amine from the viewpoint of improving the proton conductivity and heat resistance of the proton-conducting polymer 10.

One end of the first-generation branch 16 in each branched side chain 14 is bonded to an optional position of the main chain 12. Thus, the branched side chains 14 are not arranged in a particular direction, and extend randomly from the main chain 12. In other words, the branched side chains 14 extend radially from the main chain 12 as shown in FIG. 2. The branches 18, 20, 22 are spread three-dimensionally.

A virtual circle C can be formed by connecting the salts 24. Thus, the salts 24 are circumscribed by the virtual circle C having a center on the cross-sectional center of the main chain 12. The virtual circle C can extend along the longitudinal direction of the main chain 12, and thus the proton-conducting polymer 10 can have a substantially cylindrical structure. Consequently, the proton-conducting polymer 10 substantially has a shape of a cylinder, the bottom surfaces of the cylinder have the centers on the main chain 12 in cross-section, and the salts 24 are located on the peripheral wall of the cylinder.

The fourth-generation branches 22 in the branched side chains 14 do not always have to be bonded to the salt 24, and part of the fourth-generation branches 22 may be bonded to an acid or base. However, when a corresponding base or acid for forming the salt 24 with the acid or base is excessively present in the free state, the vapor pressure is increased, so that, for example, the fuel cell containing the proton-conducting polymer 10 as an electrolyte is often poor in operational stability at a high temperature. It is preferred in view of this problem that the amount of the corresponding base or acid is 1 equivalent or less, per 1 equivalent of the acid or base bonded to the end of each fourth-generation branch 22.

In the proton-conducting polymer 10 having the above structure, protons are sequentially transferred between the adjacent salts 24 to achieve the proton conduction. Thus, a conduction channel is formed on the peripheral wall of the substantially cylindrical virtual structure.

It is clear from the above description that moisture is not particularly required in the proton conduction. Thus, reaction gases for the fuel cell using the proton-conducting polymer 10 do not have to be moistened (humidified). Consequently, the above described problem of obstruction in reaction gas passages can be solved, and it is not necessary to strictly control the reaction gas humidity.

Further, in the present invention, it is not necessary to supply the moisture to the reaction gases, so that there is no need to worry about the freeze of the moisture in the reaction gases. Therefore, even when the fuel cell containing the proton-conducting polymer 10 is used at an environmental temperature below the freezing point, the fuel cell can be driven without heating.

Furthermore, the fuel cell can be used without humidifiers and heaters. Thus, the fuel cell can be used in a simple system with low equipment investment.

The dendrimer shown in FIGS. 1 and 2 has a branch generation number of 4, though the generation number is not particularly limited. As the generation number is increased, the distances between the adjacent branches are shortened to accelerate the proton conduction. The generation number is therefore preferably 2 or more.

For example, the proton-conducting polymer can be produced by the following first to third production methods.

A first production method for bonding the branched side chains 14 to the main chain 12 will be described below. In the following description, the branched side chains 14 comprise 2,2-bishydroxymethylpropionic acid (bis-MPA), and the salts 24 bonded thereto are sulfonic acid methylamine salts. bis-MPA has the following structural formula.

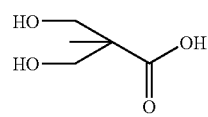

bis-MPA has one carboxyl group and two hydroxyl groups, so that the molecules of the repeating unit can be bonded by dehydration condensation to form a branched dendrimer having a carboxyl group at the end. The branch generation number of the dendrimer corresponds to the repeat count of the dehydration condensation.

For example, a polyvinyl alcohol (PVA) is then used. The PVA has side OH groups and thereby can be dehydration-condensed with the above dendrimer. Thus obtained polymer has the main chain 12 of the PVA and the branched side chains 14 of the dendrimer moieties, which contain the repeating unit of bis-MPA.

The hydroxyl groups at the end of the branched side chains 14 may be converted to sulfonic acid groups. In this step, the polymer may be dehydration-condensed with sulfoacetic acid such that the hydroxyl groups of the dendrimer moieties form ester bonds with the carboxyl groups of the sulfoacetic acid molecules, to obtain the branched side chains 14 having the sulfonic acid groups. Then, methylamine may be added to the polymer and reacted with the sulfonic acid groups to obtain the branched side chains 14 having terminal sulfonic acid methylamine salt groups.

Alternatively, the polymer may be dehydration-condensed with a sulfoacetic acid methylamine salt such that the hydroxyl groups of the dendrimer moieties form ester bonds with the sulfoacetic acid methylamine salt. The end groups bonded to the branched side chains 14 may be converted to amino groups first, and then the amino groups may be reacted with methanesulfonic acid to form a methanesulfonic acid amine salt.

The proton-conducting polymer 10 can be produced by the above steps in the first production method.

In a second production method, side chains are added to the main chain 12 first, then the side chains are branched and extended to provide the branched side chains 14, and the salts 24 are formed at the ends of the branched side chains 14. The second production method will be described in detail below. In the following description, the main chain 12 comprises a polyhydroxyethyl methacrylate (PHEMA), and the branched side chains 14 comprise a dendrimer containing a repeating unit of bis-MPA. The PHEMA has the following structural formula.

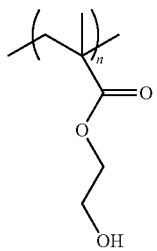

In this method, bis-MPA may be ester-bonded to the PHEMA by dehydration condensation to form bis-MPA side chains. The dehydration condensation is repeatedly carried out, so that the bis-MPA molecules are sequentially connected via ester bonds to form the branched side chains 14.

Then, the salts 24 may be formed at the ends of the branched side chains 14 in the same manner as the first production method, whereby the proton-conducting polymer 10 is produced.

In a third production method, the branched side chain 14 is bonded to a monomer, and then the monomer is polymerized to form the main chain 12. For example, the monomer may be hydroxyethylmethacrylic acid, and the branched side chain 14 may comprise a dendrimer containing a bis-MPA repeating unit.

In this method, the above dendrimer may be prepared in the same manner as the first production method. Then, the dendrimer may be ester-bonded to hydroxyethylmethacrylic acid by dehydration condensation to obtain a monomer (a macromer) having the branched side chain 14.

The macromer may be polymerized in the presence of an appropriate polymerization initiator. Thus obtained polymer has the main chain 12 of the PHEMA (a polymer of hydroxyethylmethacrylic acid) and the branched side chains 14 of the dendrimer containing the bis-MPA repeating unit. The salts 24 may be formed at the ends of the branched side chains 14 in the same manner as the first production method, to produce the proton-conducting polymer 10.

Though all the branched side chains 14 are branched and spread along directions perpendicular to the longitudinal direction of the main chain 12 in FIGS. 1 and 2, the arrangement of the branched side chains 14 is not particularly limited thereto. The branched side chains 14 may be branched and spread along the longitudinal direction of the main chain 12. Further, the directions of the branched side chains 14 may be selected therefrom, respectively.

Example 1

10 g of a PHEMA and 3.8 g of dimethylaminopyridine were dissolved in 30 g of pyridine. The pyridine solution was mixed with a solution prepared by dissolving 41.3 g of bis-MPA anhydride in 150 mL of dichloromethane. The amount of the bis-MPA anhydride was 1.5 equivalents with respect to the hydroxyl groups of the PHEMA. Then, the resultant mixture was stirred at the room temperature to carry out a reaction between the PHEMA and bis-MPA anhydride. The bis-MPA anhydride has the following structural formula.

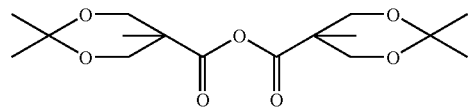

After 3 days of the reaction, water was added to the reaction mixture to hydrolyze the excess bis-MPA anhydride. The solvents were distilled off, and the residue was washed with water and dried to obtain 22.2 g of a condensed product precursor.

22.2 g of the precursor was dissolved in 1 L of methanol, and to the obtained solution was added 30 mL of AMBERLITE (an ion-exchange resin available from Rohm and Haas Company, US). The mixture was maintained at 40° C. for 7 days, and then AMBERLITE was removed. The residue was concentrated, washed with dichloromethane, and dried. Thus, 14.4 g of a polymer having the following structural formula was obtained. The polymer had a PHEMA main chain and branched side chains containing a first-generation branch of bis-MPA. Hereinafter a polymer having a PHEMA main chain and branched side chains containing bis-MPA is referred to as a PHEMA-PED, and the branch generation number of the polymer is represented in parentheses. Thus, for example, a PHEMA-PED (G1) is a polymer having only a first-generation branch, and a PHEMA-PED (G3) is a polymer having a first- to third-generation branches.

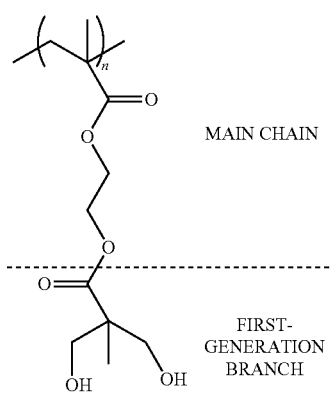

MAIN CHAIN

FIRST-GENERATION BRANCH

In the structural formula, the dashed line is shown only for the descriptive purpose to clearly distinguish between the main chain and the first-generation branch, and does not represent a bond of a functional group or repeating unit, etc. Dashed lines shown in the following structural formulae have the same meanings as this one.

1 g of the above obtained PHEMA-PED (G1) was mixed with 4 g of a sulfoacetic acid dimethylamine salt having the following structural formula, and the mixture was placed under reduced pressure at 140° C. for 10 hours to carry out a reaction between the components.

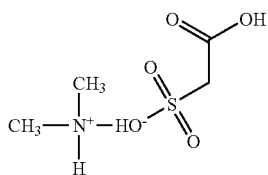

The reaction mixture was dissolved in 10 mL of water, the aqueous solution was mixed with 200 mL of ethanol to carry out reprecipitation, and the precipitate was dried, to obtain a polymer of Example 1 having the following structural formula. In the polymer of Example 1, the sulfonic acid dimethylamine salts were bonded to the ends of the branched side chains (the first-generation branches).

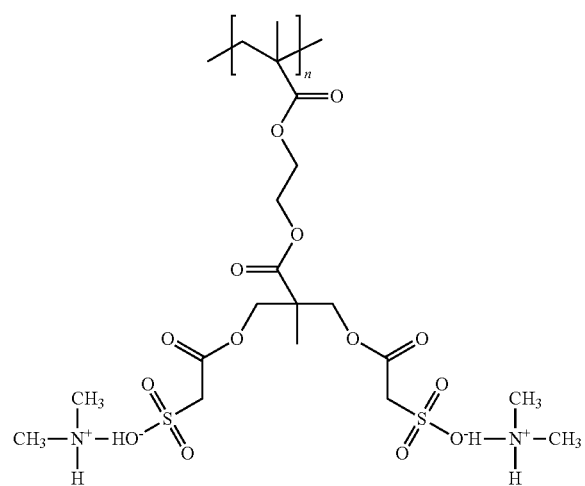

Example 2

13 g of the PHEMA-PED (G1) obtained in Example 1 and 4.8 g of dimethylaminopyridine were dissolved in 39 g of pyridine. The pyridine solution was mixed with a solution prepared by dissolving 52.9 g of bis-MPA anhydride in 150 mL of dichloromethane. The amount of the bis-MPA anhydride was 1.5 equivalents with respect to the hydroxyl groups of the PHEMA-PED (G1). Then, the resultant mixture was stirred at the room temperature to carry out a reaction between the PHEMA and bis-MPA anhydride.

After 3 days of the reaction, water was added to the reaction mixture to hydrolyze the excess bis-MPA anhydride. The solvents were distilled off, and the residue was washed with water and dried to obtain 32.2 g of a condensed product precursor. 32.2 g of the precursor was dissolved in 1 L of methanol, and to the obtained solution was added 30 mL of AMBERLITE. The mixture was maintained at 40° C. for 7 days, AMBERLITE was removed, and the residue was concentrated, washed with dichloromethane, and dried. Thus, 15 g of a PHEMA-PED (G2) having the following structural formula was obtained. The polymer had the PHEMA main chain and branched side chains containing first- and second-generation branches of bis-MPA.

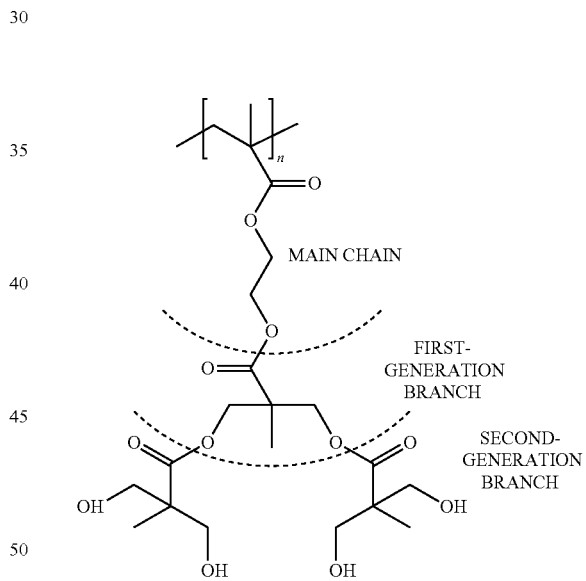

MAIN CHAIN

FIRST-GENERATION BRANCH

SECOND-GENERATION BRANCH 2 g of the PHEMA-PED (G2) was mixed with 2 g of the sulfoacetic acid dimethylamine salt, and the mixture was placed under reduced pressure at 140° C. for 10 hours to carry out a reaction between the components. The reaction mixture was dissolved in 10 mL of water, the aqueous solution was mixed with 200 mL of ethanol to carry out reprecipitation, and the precipitate was dried, to obtain a polymer of Example 2 having the following structural formula. In the polymer, the sulfonic acid dimethylamine salts were bonded to the ends of the branched side chains (the second-generation branches).

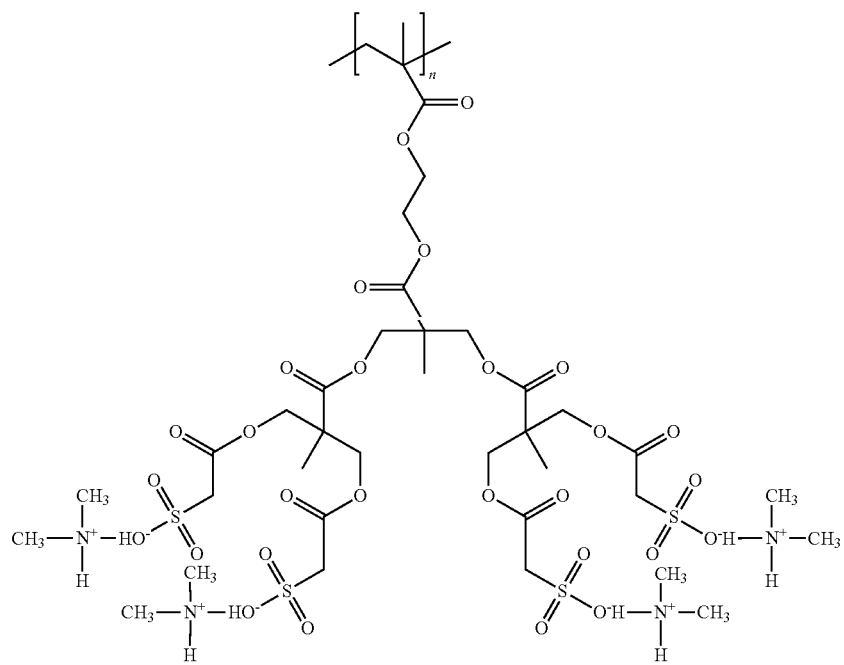

Example 3

12.1 g of the PHEMA-PED (G2) obtained in Example 2 and 4.9 g of dimethylaminopyridine were dissolved in 40 g of pyridine. The pyridine solution was mixed with a solution prepared by dissolving 54.4 g of bis-MPA anhydride in 150 ml of dichloromethane. The amount of the bis-MPA anhydride was 1.5 equivalents with respect to the hydroxyl groups of the PHEMA-PED (G2). Then, in the same manner as Examples 1 and 2, the resultant mixture was stirred at the room temperature for 3 days, the excess bis-MPA anhydride was hydrolyzed, the solvents were distilled off, and the residue was washed with water and dried, to obtain 30.5 g of a condensed product precursor.

In the same manner as Examples 1 and 2, 30.5 g of the precursor was dissolved in 1 L of methanol, and to the obtained solution was added 30 mL of AMBERLITE. The mixture was maintained at 40° C. for 7 days, AMBERLITE was removed, and the residue was concentrated, washed with dichloromethane, and dried. Thus, 16.9 g of a PHEMA-PED (G3) having the following structural formula was obtained. The polymer had the PHEMA main chain and branched side chains containing first- to third-generation branches of bis-MPA.

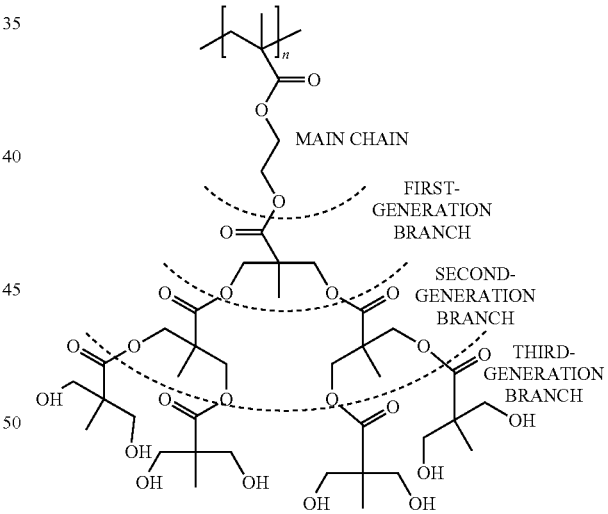

1 g of the PHEMA-PED (G3) was mixed with 4 g of the sulfoacetic acid dimethylamine salt, and the mixture was placed under reduced pressure at 140° C. for 10 hours to carry out a reaction between the components. The reaction mixture was dissolved in 10 mL of water, the aqueous solution was mixed with 200 mL of ethanol to carry out reprecipitation, and the precipitate was dried, to obtain a polymer of Example 3 having the following structural formula. In the polymer, the sulfonic acid dimethylamine salts were bonded to the ends of the branched side chains (the third-generation branches).

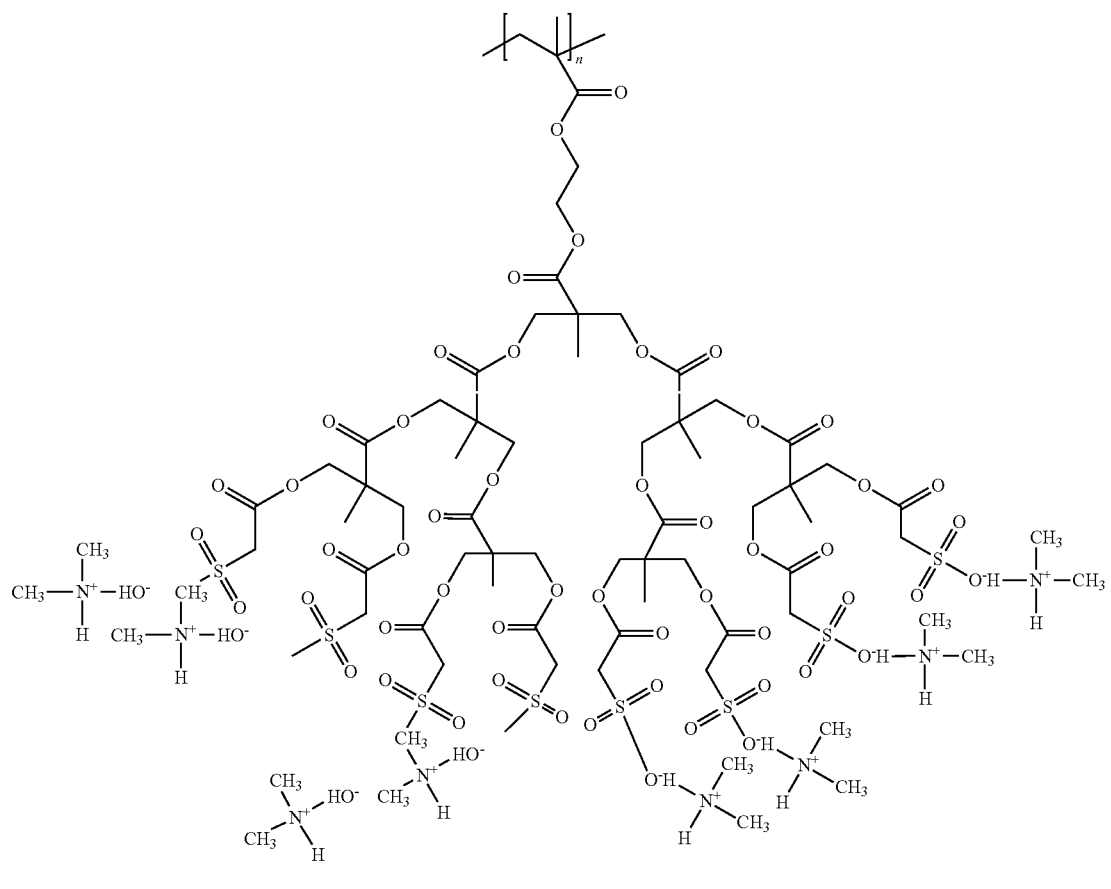

Example 4

The PHEMA-PED (G3) obtained in Example 3 was subjected repeatedly to the processes of Examples 1 to 3, to obtain a PHEMA-PED (G6) having sixth-generation branches. 2 g of the PHEMA-PED (G6) was mixed with 7 g of the sulfoacetic acid dimethylamine salt, and the mixture was placed under reduced pressure at 140° C. for 10 hours to carry out a reaction between the components. The reaction mixture was dissolved in 10 mL of water, the aqueous solution was mixed with 200 mL of ethanol to carry out reprecipitation, and the precipitate was dried, to obtain a polymer of Example 4. In the polymer, the sulfonic acid dimethylamine salts were bonded to the ends of the branched side chains (the sixth-generation branches).

Example 5

17.2 g of aziridine was dissolved in 150 mL of ether, and 76.3 g of tosyl chloride was dissolved in 350 mL of ether, respectively. The aziridine and tosyl chloride have the following structural formulae.

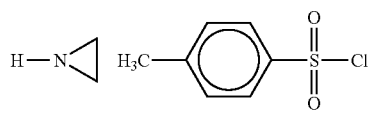

The resultant solutions were mixed while maintaining the temperature at 10° C. or lower to precipitate a salt. The salt was isolated by filtration and purified by recrystallization to obtain 53.3 g of tosylaziridine having the following structural formula.

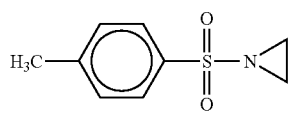

18 g of the obtained tosylaziridine and 10 g of polyallylamine (PAA) having the following structural formula were dissolved in 50 mL of ethanol, and the resultant mixture was stirred at the room temperature for 7 days to carry out a reaction between the PAA and tosylaziridine.

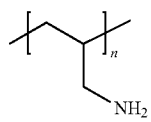

Thus produced polymer was washed with ethanol and dried, to obtain 13.6 g of a condensed product precursor. 13.5 g of the precursor was dissolved in 70 mL of a degassed concentrated sulfuric acid, and the mixture was maintained at 130° C. for 15 hours. Ether was added to the resultant reaction mixture while maintaining the temperature at 10° C. or lower, to precipitate a reaction product. The reaction product was isolated by filtration and dissolved in 100 mL of water to prepare an aqueous solution. A 20% KOH aqueous solution was added to the aqueous solution such that the solution had a pH of 12. The solvents were distilled off, and the residue was dissolved in methanol again to precipitate an impurity. The impurity was removed by filtration, and the filtrate was dried to obtain 4.2 g of a polymer having the following structural formula. In the polymer, two branched side chains of —CH$_2$—CH$_2$—NH$_2$ groups were bonded to one N atom in the PAA. Hereinafter a polymer having a PAA main chain and branched side chains containing a —CH$_2$—CH$_2$—NH$_2$ group is referred to as a PAA-PEID, and the branch generation number of the polymer is represented in parentheses in the same manner as above.

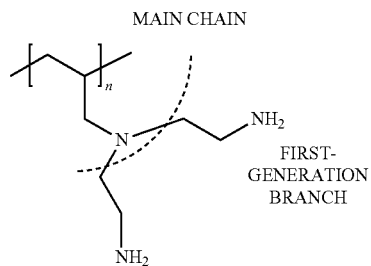

0.5 g of the PAA-PEID (G1) was dissolved in 2.5 g of water to prepare an aqueous solution, and thereto was added an aqueous solution containing methanesulfonic acid. The amount of the methanesulfonic acid was 1 equivalent with respect to the primary amine groups at the ends of the branched side chains. The aqueous mixture solution was purified by dialysis, to obtain a polymer of Example 5 having the following structural formula. In the polymer, sulfonic acid amine salts were bonded to the ends of the branched side chains (the first-generation branches).

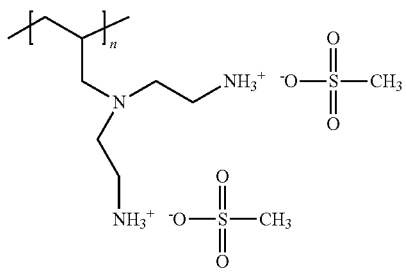

Example 6

2 g of the PAA-PEID (G1) obtained in Example 5 and 14.4 g of tosylaziridine, which was obtained in the same manner as in Example 5, were dissolved in 50 mL of ethanol, and stirred at the room temperature for 7 days to carry out a reaction between the PAA-PEID (G1) and tosylaziridine.

The produced polymer was washed with ethanol and dried, to obtain 7.8 g of a condensed product precursor. 7.8 g of the precursor was dissolved in 70 mL of a degassed concentrated sulfuric acid, and heated at 130° C. for 15 hours. Then, the mixture was treated in the same manner as in Example 5 to obtain 2.4 g of a PAA-PEID (G2) having the following structural formula. In the polymer, two —CH$_2$—CH$_2$—NH$_2$ groups were bonded to one N atom in the —CH$_2$—CH$_2$—NH$_2$ groups of the PAA-PEID (G1).

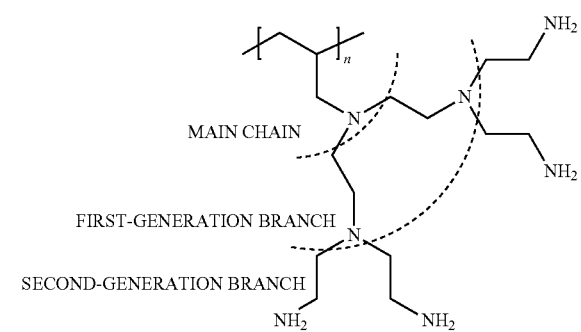

0.5 g of the obtained PAA-PEID (G2) was dissolved in 2.5 g of water, and the prepared aqueous solution was treated in the same manner as in Example 5, to obtain a polymer of Example 6 having the following structural formula. In the polymer, sulfonic acid amine salts were bonded to the ends of the branched side chains (the second-generation branches).

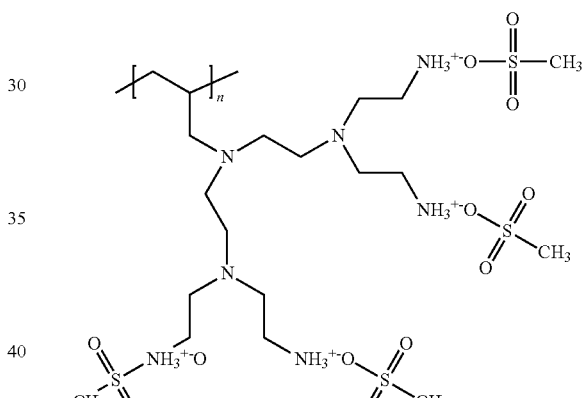

Example 7

1 g of the PAA-PEID (G2) obtained in Example 6 and 7.5 g of tosylaziridine obtained in the same manner as in Example 5 were dissolved in 25 mL of ethanol, and stirred at the room temperature for 7 days to carry out a reaction between the PAA-PEID (G2) and tosylaziridine.

The produced polymer was washed with ethanol and dried, to obtain 4.6 g of a condensed product precursor. 4.6 g of the precursor was dissolved in 50 mL of a degassed concentrated sulfuric acid, and heated at 130° C. for 15 hours. Then, the mixture was treated in the same manner as in Examples 5 and 6 to obtain 1.5 g of a PAA-PEID (G3) having the following structural formula. In the polymer, two —CH$_2$—CH$_2$—NH$_2$ groups were bonded to one N atom in the —CH$_2$—CH$_2$—NH$_2$ groups of the PAA-PEID (G2).

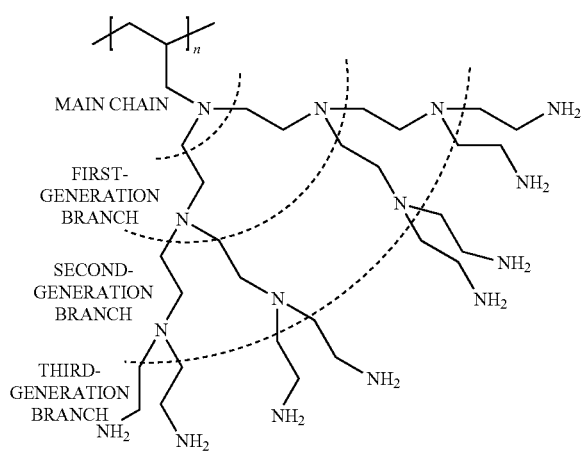

0.3 g of the obtained PAA-PEID (G3) was dissolved in 2.5 g of water, and the prepared aqueous solution was treated in the same manner as in Examples 5 and 6, to obtain a polymer of Example 7 having the following structural formula. In the polymer, sulfonic acid amine salts were bonded to the ends of the branched side chains (the third-generation branches).

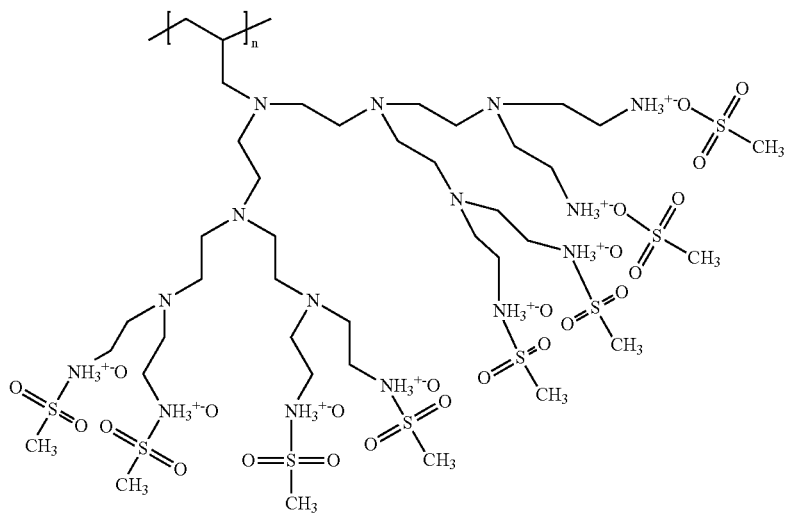

Example 8

A polymer of Example 8 was produced in the same manner as in Example 5 except for using trifluoromethanesulfonic acid instead of methanesulfonic acid. In the polymer, trifluoromethanesulfonic acid amine salts were bonded to the ends of the branched side chains (the first-generation branches) of the PAA-PEID (G1).

Example 9

A polymer of Example 9 was produced in the same manner as in Example 6 except for using trifluoromethanesulfonic acid instead of methanesulfonic acid. In the polymer, trifluoromethanesulfonic acid amine salts were bonded to the ends of the branched side chains (the second-generation branches) of the PAA-PEID (G2).

Example 10

A polymer of Example 10 was produced in the same manner as in Example 7 except for using trifluoromethanesulfonic acid instead of methanesulfonic acid. In the polymer, trifluoromethanesulfonic acid amine salts were bonded to the ends of the branched side chains (the third-generation branches) of the PAA-PEID (G3).

Example 11

0.3 g of the polymer obtained in Example 3 was dissolved in 20 mL of methanol, and to the solution was added 0.3 g of DOWEX (an ion-exchange resin available from Dow Chemical Company, US). After reacting the components for 1 hour, DOWEX was removed, the solvent was distilled off, and the residue was dried, to obtain a polymer of Example 11. In the polymer, 50% of terminal moieties bonded to the branched side chains were in the state of sulfonic acid dimethylamine salt, and another 50% thereof were in the state of sulfonic acid.

Example 12

0.2 g of the PAA-PEID (G3) obtained in Example 7 was dissolved in 2.5 g of water, and thereto was added an aqueous methanesulfonic acid solution. In the solution, the amount of the methanesulfonic acid was 0.1 equivalent with respect to primary amine groups at the ends of the branched side chains. The resultant mixture was purified by dialysis to obtain a polymer of Example 12. In the polymer, 10% of terminal moieties bonded to the branched side chains (the third-generation branches) were in the state of a sulfonic acid amine salt, and the other thereof were in the state of the primary amine.

Example 13

0.3 g of the PAA-PEID (G3) obtained in Example 7 was dissolved in 2.5 g of water, and thereto was added an aqueous methanesulfonic acid solution. In the solution, the amount of the methanesulfonic acid was 0.2 equivalent with respect to primary amine groups at the ends of the branched side chains. Then, the resultant mixture was treated in the same manner as in Example 12 to obtain a polymer of Example 13. In the polymer, 20% of terminal moieties bonded to the branched side chains (the third-generation branches) were in the state of a sulfonic acid amine salt, and the other thereof were in the state of the primary amine.

Example 14

Each of the polymers of Examples 1 to 13 was hot-pressed at 150° C. for 5 minutes at a pressure of 10 kgf/cm$^2$ into a film having a thickness of 50 μm.

A test sample having a size of 10 mm×30 mm×50 μm was cut out from the film, and maintained at 120° C. to remove moisture. Two electrodes were attached to one end surface of each sample at a predetermined distance respectively, and were electrically connected to an impedance analyzer S-1260 available from Solartron. The impedance of each sample was measured at 120° C. by an alternating current complex impedance method, and the proton conductivity σ (S/cm) of the sample was obtained from the measured value using the following equation (A). In the equation (A), N represents a thickness (50 μm), M represents a width (10 mm), L represents a distance between electrodes, and R represents an impedance.

$$\sigma = \frac{L}{R \cdot M \cdot N} \quad (A)$$

A sample having the above size according to Comparative Example was produced from NAFION 112 (trade name, a proton-conducting polymer containing a sulfonic acid-bonded perfluoropolymer available from DuPont). The sample of Comparative Example was dried in vacuum at 80° C., and the proton conductivity σ was obtained in the same manner as Examples 1 to 13.

The results are shown in FIG. 3. It is clear from FIG. 3 that the proton conductivities σ of Examples 1 to 13 are higher than that of Comparative Example, and thus the proton-conducting polymers of Examples 1 to 13 showed sufficient proton conductivities even under a dry state.

Further, it is clear from comparison between Examples 1 to 4, between Examples 5 to 7, and between Examples 8 to 10 that the proton conductivity was improved as the branch generation number was increased. It is supposed that, when the generation number is larger, the distance between adjacent terminal salt groups is smaller, resulting in acceleration of the proton transfer between the groups.

Although certain preferred embodiments of the present invention have been shown and described in detail, it should be understood that various changes and modifications may be made therein without departing from the scope of the appended claims.

What is claimed is:

1. A proton-conducting polymer comprising a linear main chain and a plurality of branched side chains, wherein each of said branched side chains is bonded to said main chain at one end and bonded to a proton-conducting salt at another end,
   said branched side chains extend radially from said main chain, and
   said salt is circumscribed by a virtual circle having a center on a cross-sectional center of said main chain such that a radial direction of said virtual circle is perpendicular to a longitudinal direction of said main chain, wherein an acid or base for forming said salt forms said salt with 1 equivalent or less of a corresponding base or acid for forming said salt.

2. A proton-conducting polymer according to claim 1, wherein each of said branched side chains is bonded to at least one acid or base for forming said salt.

3. A proton-conducting polymer according to claim 1, wherein each of said branched side chains comprises a dendrimer obtained by repeatedly bonding a repeating unit.

4. A proton-conducting polymer according to claim 1, wherein said salt is derived from sulfonic acid and a primary or secondary amine.

5. A proton-conducting polymer according to claim 1, wherein said salt is derived from a Bronsted acid and an amine.

6. A proton-conducting polymer according to claim 5, wherein said Brønsted acid is sulfonic acid, phosphoric acid, or phosphonic acid.

7. A proton-conducting polymer according to claim 5, wherein said amine is ammonia, an aliphatic amine, an alicyclic amine, or a nitrogen-containing heterocyclic compound.

8. A proton-conducting polymer according to claim 5, wherein said salt is derived from sulfonic acid and a primary or secondary amine.

9. A proton-conducting polymer according to claim 1, wherein said main chain comprises a polyvinyl alcohol (PVA) or a polyhydroxyethyl methacrylate (PHEMA), and each of said branched side chains comprises 2,2-bishydroxymethyl-propionic acid (bis-MPA).

10. A proton-conducting polymer according to claim 1, wherein said main chain comprises a polyallylamine (PAA), and each of said branched side chains comprises a —CH$_2$—CH$_2$—NH$_2$ group bonded to an N atom in said polyallylamine (PAA).

* * * * *